United States Patent
Krüger et al.

(10) Patent No.: US 10,563,862 B2
(45) Date of Patent: Feb. 18, 2020

(54) ARRANGEMENT OF A COMBUSTOR AND A DEVICE FOR SELECTIVE NON CATALYTIC REDUCTION AND INJECTION NOZZLE

(71) Applicant: General Electric Technology GmbH, Baden (CH)

(72) Inventors: Sascha Krüger, Bad Berka (DE); Jörg Krüger, Schwandorf (DE); Oliver Gohlke, Stuttgart (DE)

(73) Assignee: General Electric Company, Schenectady, NY (US)

( * ) Notice: Subject to any disclaimer, the term of this patent is extended or adjusted under 35 U.S.C. 154(b) by 116 days.

(21) Appl. No.: 15/544,714

(22) PCT Filed: Jan. 12, 2016

(86) PCT No.: PCT/EP2016/050446
§ 371 (c)(1),
(2) Date: Jul. 19, 2017

(87) PCT Pub. No.: WO2016/066861
PCT Pub. Date: May 6, 2016

(65) Prior Publication Data
US 2018/0017252 A1    Jan. 18, 2018

(30) Foreign Application Priority Data
Jan. 20, 2015 (EP) ..................... 15151716

(51) Int. Cl.
*F23J 15/00* (2006.01)
*B01D 53/56* (2006.01)
(Continued)

(52) U.S. Cl.
CPC ............ *F23J 15/003* (2013.01); *B01D 53/56* (2013.01); *B01D 53/79* (2013.01); *B05B 1/08* (2013.01);
(Continued)

(58) Field of Classification Search
CPC ...................................... F23J 15/003
See application file for complete search history.

(56) References Cited

U.S. PATENT DOCUMENTS

| 2,413,083 A | 12/1946 | Snowden et al. | |
| 2,558,238 A * | 6/1951 | Collins | E03C 1/086 239/461 |

(Continued)

FOREIGN PATENT DOCUMENTS

| CN | 2528517 Y | 1/2003 |
| CN | 102728491 A | 10/2012 |

(Continued)

OTHER PUBLICATIONS

Kruger, J., et al., "Steigerung der Effizienz von SNCR-Anlagentechnik," VGB PowerTech 4, pp. 1-9 (2012).

(Continued)

*Primary Examiner* — Nathaniel Herzfeld
(74) *Attorney, Agent, or Firm* — Dority & Manning, P.A.

(57) ABSTRACT

The nozzle for injecting a reagent into a combustor has a body with a cavity, an occlusion for the cavity, a slit for injecting the reagent, at least one intermediate disc between the body and the occlusion, the at least one intermediate disc having at least one opening for the passage of the reagent, wherein the nozzle further has a first slit between the body and the at least one intermediate disc, a second slit between the occlusion and the at least one intermediate disc (56), and/or at least one slit having at least one corrugated border defining a variable size slit between a minimum size and a maximum size.

16 Claims, 6 Drawing Sheets

(51) Int. Cl.
*B01D 53/79* (2006.01)
*B05B 1/08* (2006.01)
(52) U.S. Cl.
CPC ............... *B01D 2251/2062* (2013.01); *B01D 2251/2067* (2013.01); *B01D 2257/402* (2013.01); *B01D 2257/404* (2013.01); *B01D 2258/0283* (2013.01); *B01D 2259/124* (2013.01); *F23J 2219/20* (2013.01); *Y02C 20/10* (2013.01)

(56) References Cited

U.S. PATENT DOCUMENTS

| | | | | |
|---|---|---|---|---|
| 2,701,738 | A * | 2/1955 | Cerasi | B05B 1/14 239/440 |
| 3,737,105 | A * | 6/1973 | Arnold | B05B 1/06 239/423 |
| 4,700,894 | A * | 10/1987 | Grzych | A62C 31/02 239/555 |
| 5,281,403 | A * | 1/1994 | Jones | B01D 53/8625 423/235 |
| 5,453,258 | A | 9/1995 | Lippmann et al. | |
| 6,988,454 | B2 * | 1/2006 | Marx | F23J 7/00 110/214 |
| 7,188,789 | B2 * | 3/2007 | Schwegler | B01J 4/002 239/419 |
| 7,644,909 | B2 * | 1/2010 | Huhta-Koivisto | B01F 3/04758 261/115 |
| 2006/0008393 | A1 | 1/2006 | Schindler | |
| 2008/0202397 | A1 * | 8/2008 | Torbov | B01D 53/79 110/345 |
| 2015/0211403 | A1 * | 7/2015 | Brunello | F01N 3/2066 134/10 |
| 2015/0345785 | A1 * | 12/2015 | Valentine | F23J 15/003 110/215 |

FOREIGN PATENT DOCUMENTS

| | | |
|---|---|---|
| DE | 4 315 385 A1 | 11/1994 |
| DE | 4315385 A1 | 11/1994 |
| DE | 10 2010 050 334 A1 | 5/2012 |
| DE | 102010050334 A1 | 5/2012 |
| DE | 20 2014 004 495 U1 | 7/2014 |
| EP | 1 256 761 A2 | 11/2002 |
| JP | S64-5697 A | 1/1989 |
| WO | 2012/059184 A1 | 5/2012 |

OTHER PUBLICATIONS

Extended European Search Report and Opinion issued in connection with corresponding EP Application No. 15151716.6 dated Apr. 22, 2015.
International Search Report and Written Opinion issued in connection with corresponding PCT Application No. PCT/EP2016/050446 dated Mar. 30, 2016.
Intention to Grant issued in connection with corresponding EP Application No. 15151716.6 dated Apr. 4, 2017.
International Preliminary Report on Patentability issued in connection with corresponding PCT Application No. PCT/EP2016/050446 dated Jul. 25, 2017.
Machine Translation and First Office Action and Search issued in connection with corresponding CN Application No. 201680000359.6 dated Jan. 31, 2018.
Second Office Action and Supplementary Search issued in connection with corresponding CN Application No. 201680000359.6 dated Oct. 22, 2018.

* cited by examiner

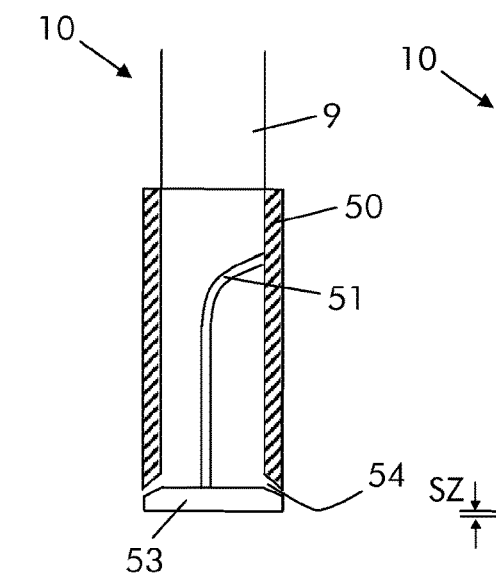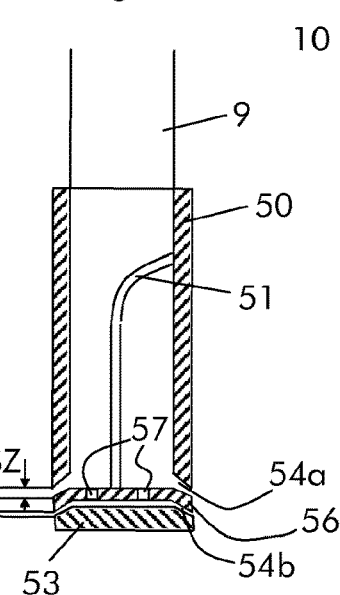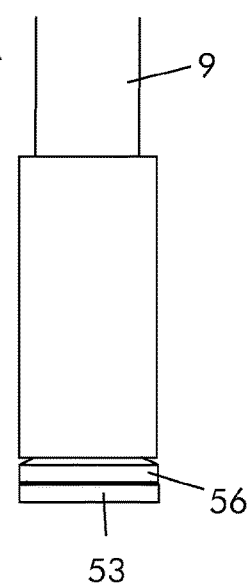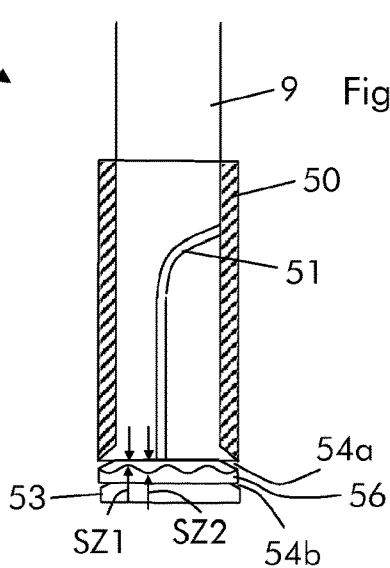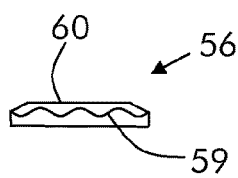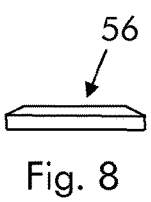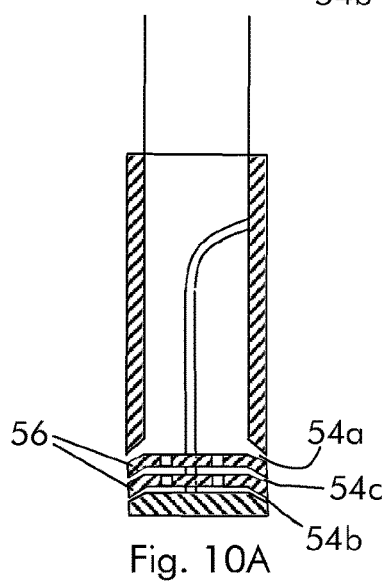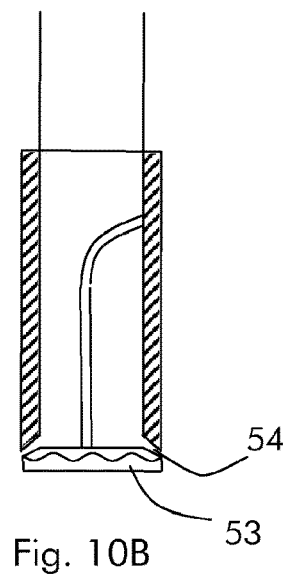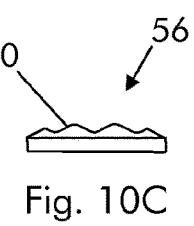

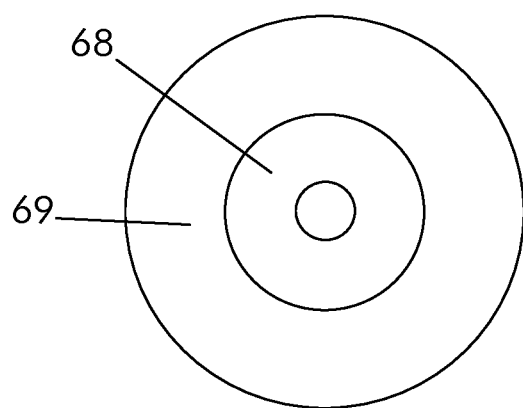
Fig. 13
Fig. 14
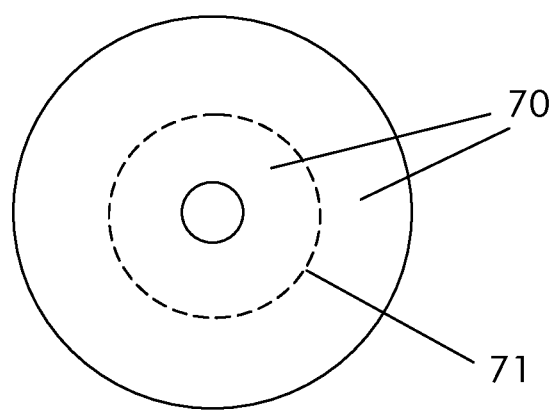

US 10,563,862 B2

ARRANGEMENT OF A COMBUSTOR AND A DEVICE FOR SELECTIVE NON CATALYTIC REDUCTION AND INJECTION NOZZLE

FIELD OF THE INVENTION

The present invention relates to an arrangement of a combustor and a device for selective non catalytic reduction and nozzle. In particular, the present invention refers to a combustor being a boiler, such as a boiler of a power plant for electric power generation; the combustor can anyhow be a different combustor, such as a rotary kiln for cement production. In the following reference to a boiler is made.

BACKGROUND TO THE INVENTION

Boilers comprise tubed walls defining an inner space; a fuel such as coal, oil, waste is supplied into the inner space and is combusted with an oxidizer, such as air or oxygen. During the combustion flue gas is generated that is rich in $NO_x$, whose amount has to be reduced below given limits before the flue gas is vented into the atmosphere.

In order to remove $NO_x$ from the flue gas, a regent such as ammonia ($NH_3$ as liquid solution) or urea ($CH_4N_2O$ as liquid solution) can be injected into the flue gas and the flue gas can be passed through a catalyzer, for the $NO_x$ to be converted into $N_2$ and $H_2O$ (selective catalytic reduction, SCR); this reaction occurs at low temperatures, e.g. between 250-450° C.

The catalyst is expensive and can be damaged during operation, for this reason a method has been developed according to which ammonia or urea are injected into the flue gas having a high temperature, e.g. in the range 750-1300° C., such that the $NO_x$ conversion into $N_2$ and $H_2O$ occurs without the need of a catalyst (selective non catalytic reduction, SNCR).

WO2012/059 184 discloses a boiler for waste to energy applications (i.e. waste is used as a fuel in the boiler). The boiler has an aperture at its top wall such that a device for selective non catalytic reduction is introduced into the inner space through this aperture. The device for selective non catalytic reduction has a tubular lance and a hose sliding into the lance. The hose has a nozzle at its end housed in the inner space. During operation the lance hangs from the top wall of the boiler and the hose extends from the lance; the reagent passes through the hose and is injected through the nozzles upwards.

The reagent after injection has to evaporate to mix with the flue gas, for the mixture to undergo the selective non catalytic reaction for $NO_x$ removal. The inventors have found that evaporation occurs in a limited space around the nozzle; it would be beneficial to have a larger evaporation zone for a larger amount of the flue gas to mix with vapor reagent and thus treat a larger portion of flue gas by selective non catalytic reaction.

BRIEF DESCRIPTION OF THE INVENTION

An aspect of the invention includes providing an arrangement and a method that allow reagent evaporation in a large area around the nozzle.

In an embodiment of the nozzle for injecting a reagent into a combustor, the nozzle comprises a body with a cavity, an occlusion for the cavity, a slit for injecting the reagent, characterized by further comprising at least one intermediate disc between the body and the occlusion, the at least one intermediate disc having at least one opening for the passage of the reagent, wherein the nozzle further has a first slit between the body and the at least one intermediate disc, a second slit between the occlusion and the at least one intermediate disc, and/or at least one slit having at least one corrugated border defining a variable size slit between a minimum size and a maximum size.

BRIEF DESCRIPTION OF THE DRAWINGS

Further characteristics and advantages will be more apparent from the description of a non-exclusive embodiment of boiler, illustrated by way of non-limiting example in the accompanying drawings, in which:

FIG. 5 shows an embodiment of the nozzle according to the prior art;
FIGS. 6, 7, 8, 9, 10, 10A, 10B, and 10C show different embodiments of the nozzle;
FIGS. 13 and 14 show the evaporation areas for different nozzles operated in different ways.

DETAILED DESCRIPTION

Figure 1:
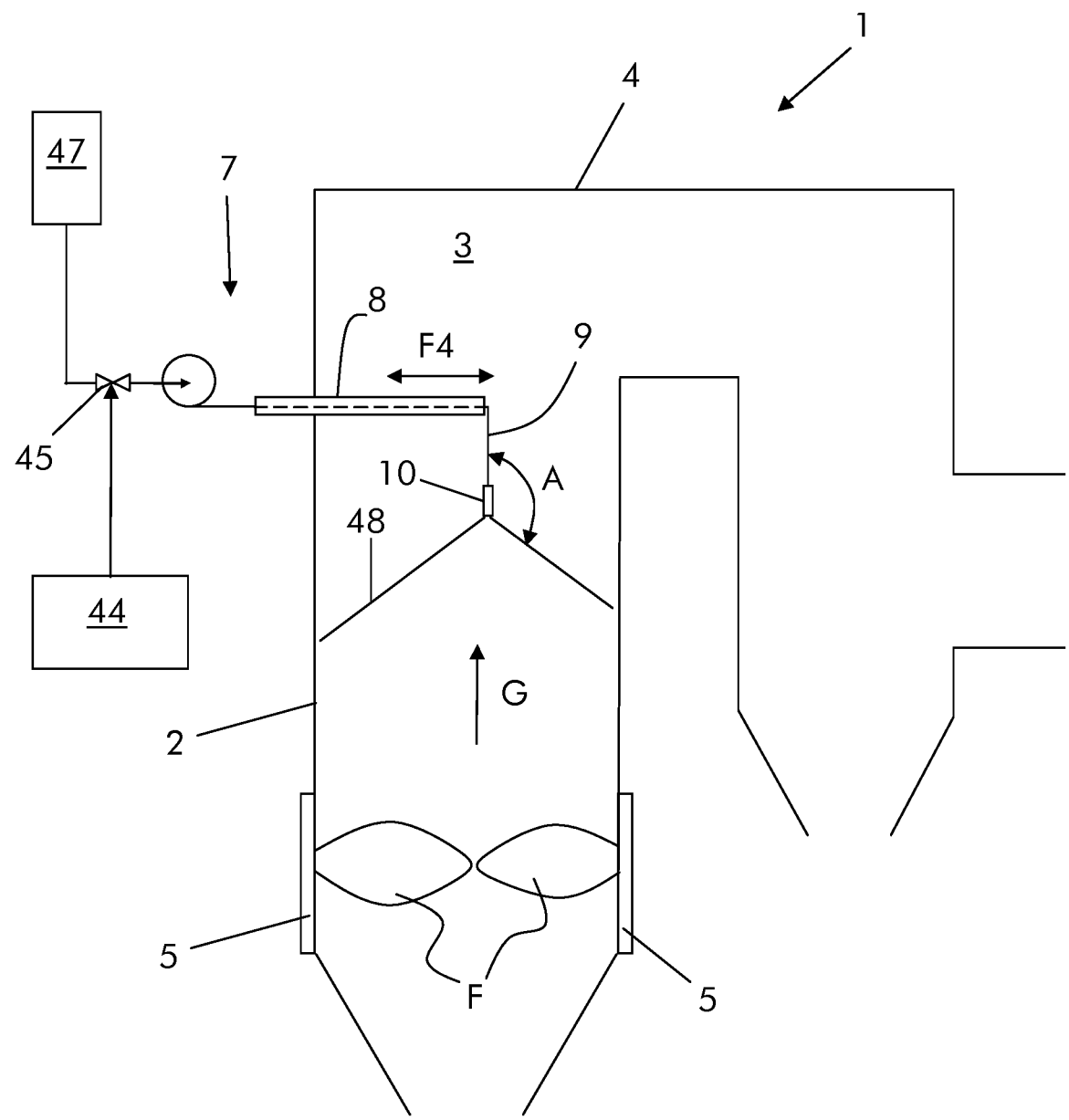
FIG. 1 shows a schematic boiler.

With reference to the figures, these show a combustor being a boiler 1 comprising side tubed walls 2 enclosing an inner space 3 and a top wall 4. The boiler is supplied with fuel such as coal (but other kinds of fuel such as waste, oil, gas, etc. are possible) and an oxidizer such as air or oxygen via burners 5.

The boiler also has a device 7 for selective non catalytic reduction SNCR; the device 7 comprises a lance 8 carrying a hose 9 having at least a nozzle 10; as shown. In an embodiment, the nozzle is at the hose terminal part that is housed within the inner space 3. The device 7 further has a hose drive mechanism 11 for driving the hose within the lance 8.

The figures show an example of a 2-pass boiler and in this case the device 7 is associated to the first pass, it is anyhow clear that the boiler can be any type of boiler and the device 7 can be located anywhere, at locations where temperatures for correct selective non catalytic reaction exist.

In an embodiment, the lance 8 protrudes into the inner space 3 from a side tubed wall 5 of the boiler. This way the length of the hose housed within the inner space 3 is shorter than in case the lance was hanging from the top wall 4 of the boiler, such that the reagent passing through the hose during operation does not evaporate or at least does not undergo evaporation to a large extent before it reaches the nozzle 10. In an embodiment, the lance 8 protrudes substantially horizontally.

Figure 2:
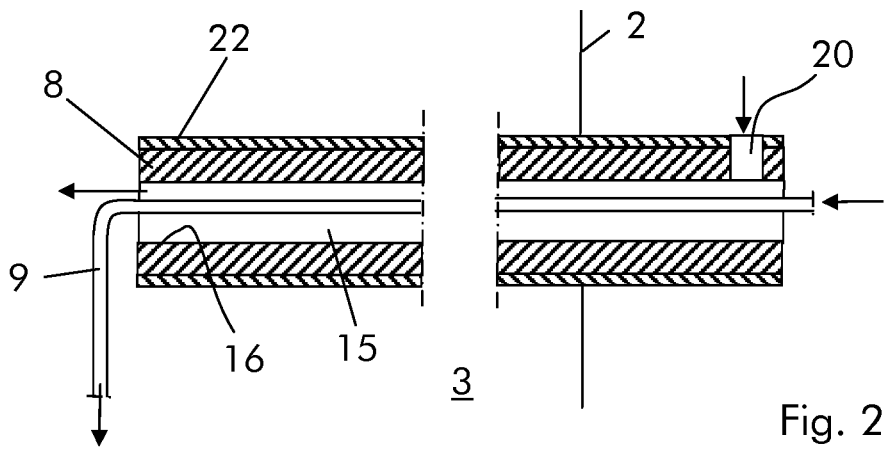
FIGS. 2, 3, and 4 show different embodiments of the lance.
Figure 3:
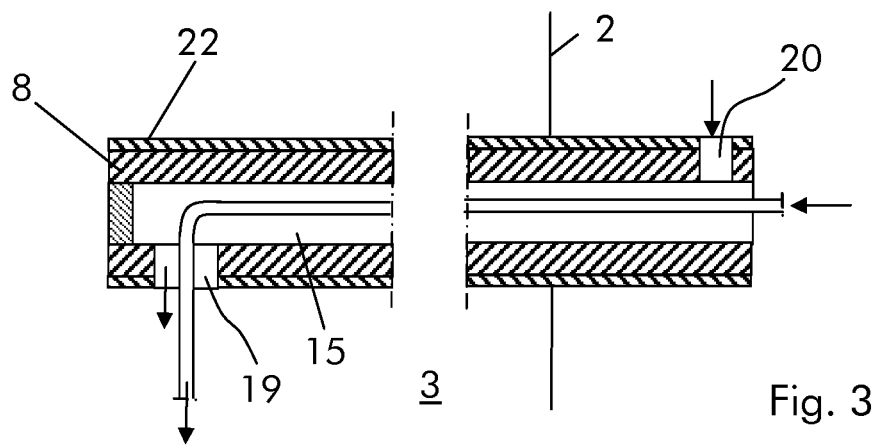
Figure 4:
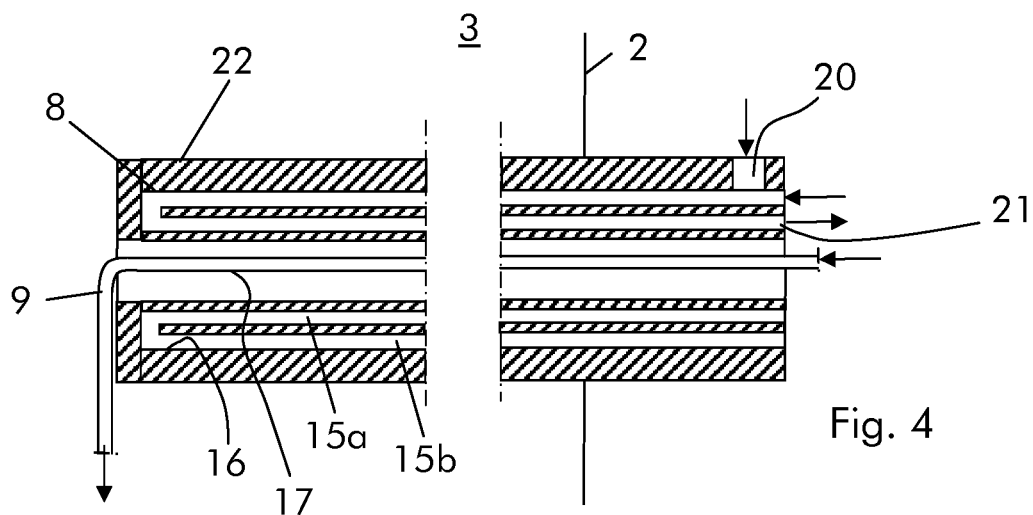

In order to further counteract the evaporation of the reagent, the lance 8 is provided with a cooling system, in an embodiment; FIGS. 2 through 4 show lances 8 with different cooling systems.

The cooling system comprises one or more channels 15 for a cooling medium such as air and/or another gas and/or steam and/or water. In an embodiment, the channels 15 have an annular shape and are located between a lance wall 16 and the hose 9. For example, FIG. 2 shows a lance 8 with the hose 9 projecting from its open end; one annular channel 15 is defined between the wall 16 of the lance 8 and the hose 9. FIG. 3 shows a lance 8 having an opening 19 and the hose 9 projecting from this opening 19; one annular channel 15 is defined between the wall 16 of the lance 8 and the hose 9. FIG. 4 shows a lance 8 with the hose 9 projecting from its open end; two annular channels 15a, 15b are defined between the wall 16 of the lance 8 and the hose 9.

An inlet 20 into the channels 15, 15a, 15b for the cooling medium is located at a portion of the lance 8 outside the inner space 3 (FIGS. 2-4); in contrast, an outlet from the channels 15, 15a, 15b can be located at a portion of the lance 8 inside the inner space 3 (FIGS. 2 and 3) and can be defined by the opening 19 and/or the outlet can be located at a portion of the lance 8 outside the inner space 3 (FIG. 4) and can be defined by a dedicated opening 21.

In addition, the lance 8 can have an outer insulation layer 22 for thermally insulating the lance and protecting it against the flue gas. The outer insulation layer 22 is implemented if needed according to the heat removal capacity of the cooling system.

In case the cooling medium is air and/or another gas: when the air/other gas has a low pressure (for example air/other gas are supplied into the channels 15, 15a, 15b via a blower) the insulation layer 22 is typically needed; when the air/other gas has a medium pressure (for example air/other gas are supplied into the channels 15, 15a, 15b via a blower) the insulation layer 22 is typically not needed because the increased pressure of the air/other gas allows a sufficient heat removal; when the air/other gas has a high pressure (for example air/other gas are supplied into the channels 15, 15a, 15b via a compressor) the insulation layer 22 is typically not needed.

When the cooling medium is air/other gas it can be discharged into the inner space 3 of the boiler (i.e. the lance 8 can have the structure shown in FIG. 2 or 3); in fact, the air can allow further reaction of the fuel (i.e. it can act like overfire air).

In case the cooling medium is water it can be supplied to the channels 15, 15a, 15b at medium pressure typically without any need of outer insulating layer 22; in this case the water can be discharged either within the inner space 3 (like in FIGS. 2 and 3) or outside of the inner space 3 (like in FIG. 4).

In case the cooling medium is steam: it can be supplied into the channels 15, 15a, 15b at low pressure, typically without any need of the outer insulating layer 22; in this case the steam is discharged into the inner space 3 (like the lance shown in FIGS. 2 and 3); it can be supplied to the channels 15, 15a, 15b at high pressure, typically without any need of the outer insulating layer 22; in this case the steam is discharged outside of the inner space 3 (like the lance shown in FIG. 4).

Naturally the specific design of the lance, the presence of the outer insulating layer and the location of the inlet 20 and outlet, the configuration of the channels 15, 15a, 15b, the type of cooling means and the pressure of the cooling means can be any combination and will depend on the particular conditions.

In an embodiment, the lance 8 is provided with a lance positioning system for regulating the position of the hose 9 within the inner space 3. In particular, the lance positioning system is arranged for regulating the position of the lance over its longitudinal axis 25.

In one embodiment, the lance positioning system for regulating the position of the lance over its longitudinal axis comprises a lance support beam 26 and a chariot 27 movable on the support beam 26; the lance 8 is connected to the chariot 27.

A drum 29 is also provided for carrying the hose 9; in further embodiments the drum 29 is not connected to the chariot 27; it can for example be connected to and supported by the support beam 26 or an external support.

The chariot 27 further supports the hose drive mechanism 11. The hose drive mechanism 11 has opposing wheels 31 through which the hose 9 passes through and a motor 32 for driving the wheels 31, such that during operation the wheels 31 drive the hose 9 and the drum 29 is only used to wind or unwind the hose 9. A drive system for example with a chain 36 and a motor 37 is used to drive the chariot 27 along the support beam 26. In this respect the chariot 27 is fixed to the chain 36 at a position 38.

Additionally, the support beam could also have a hinge 40 and a side drive mechanism for example comprising a chain 41 having the ends connected to the support beam 26 and wheels 42; at least one of the wheels 42 is connected to a motor 43 for controlling and adjusting the side position over the arrows S.

The boiler 1 further has a control system 44 for controlling the flow from the nozzle 10. In an embodiment, the control system 44 can be arranged for generating a pulsed flow from the nozzle 10. For example, the boiler can have one or more valves 45 connected to and driven by the control system 44 for generating the pulsed flow. In addition or as an alternative the reagent can be supplied via a pump that is controlled in order to provide the pulsed flow. Other means for generating the pulsed flow are naturally possible.

The operation of the boiler is apparent from that described and illustrated and is substantially the following.

Fuel and oxidizer are supplied into the inner space 3 and the fuel is combusted generating flames F and flue gas G that passes through the boiler. The flue gas contains $NO_x$ (mainly NO and lower amounts of $NO_2$) that has to be at least partly removed.

The lance 8 is introduced into the inner space 3, e.g. through a side opening of the side tubed wall 2 (but this is not mandatory and the lance can be introduced into the inner space from e.g. the top wall 4 of the boiler); the opening can be an opening for different scopes, such as an inspection opening or a dedicated opening.

From the lance 8 the hose 9 and the nozzle 10 hang in the inner space 3.

The nozzle position can be adjusted both horizontally and vertically.

The nozzle position is adjusted vertically for the nozzle 10 to inject the reagent in zones where the temperature is the best for selective non catalytic reaction. The vertical adjustment can be done by operating the motor 32 in order to drive the wheels 31 for pushing/pulling the hose 9 through the lance 8 as indicated by arrow F1 and regulating the nozzle vertical position as indicated by the arrow F2.

The nozzle position is adjusted along the axis 25 (for example horizontally) to place the nozzle 10 in zones where the flue gas velocity (and thus the mass flow) is higher, because the most of the $NO_x$ passes through these zones. The nozzle position can be horizontally regulated along the support beam 26 by operating the motor 37 in order to drive the chariot 27 along the support beam 26 as indicated by the arrow F3. The movement of the chariot 27 causes the corresponding movement of the lance 8 along the support beam 26 as indicated by the arrow F4.

Additionally, the nozzle position can also be pivotally adjusted. This is often not needed because in particular for large boilers more than one lance are provided; anyway side adjustment could render regulation more flexible. In this case the regulation can be done by operating the motor 43 in order to move the chain 41 as indicated by the arrows F5 and thus pivot the support beam 26 (and the lance 8 supported by it) as indicated by the arrows S.

The position of the nozzle can be adjusted before the boiler is started, according the foreseeable operating conditions, but can also be changed during operation of the boiler, in response to changed operating conditions or to betted adapt the nozzle position to the current operating conditions and/or temperature distribution and/or flue gas velocity distribution.

During operation of the boiler 1, the hose 9 is supplied with a reagent such as ammonia or urea from a tank 47; the reagent passes through the hose 9 and is injected via the nozzle 10.

Different possibilities are available for the injection. In an embodiment, the reagent is injected over a conical surface 48 for example via a slot, but it can also be injected via a plurality of single jets each resting on a conical surface. In an embodiment, the angle A between the hose 9 and the flow injected through the nozzle 10 is in the range $0°<A<180°$, more particularly it is in the range $90°<A<180°$ and even more particularly it is in the range $135°<A<155°$.

Figure 11:
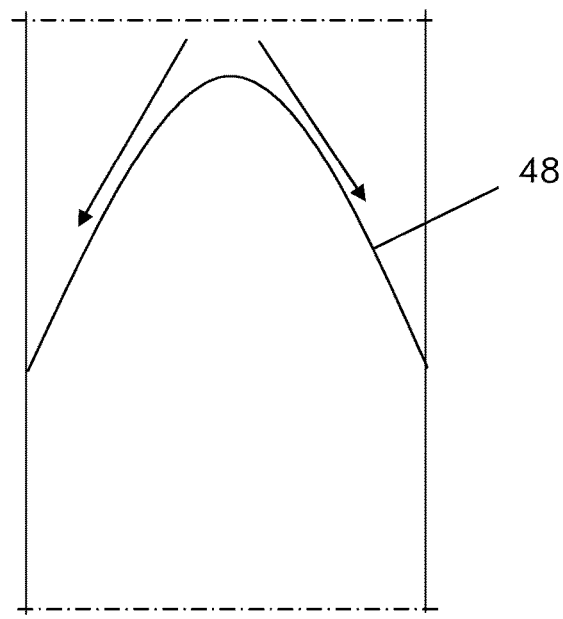
FIG. 11 shows an isothermal curve within the inner space of the boiler (above the flame)

An injection over a conical surface 48 defining an angle A between $90°$-$180°$ and $135°$-$155°$ in an embodiment which can be advantageous because it allows to spray the reagent over areas where the temperature is uniform. In fact, the temperature within the inner space 3 is lower close to the side tubed walls 2 and it is lower upwards (i.e. apart from the flame); therefore the isothermal curve has a bell shape with ends directed downwards and close to the tubed side walls 2 (FIG. 11). Therefore injection over a conical surface with apex at the top and directed downwards allows the reagent to intersect the flue gas having a substantially uniform or more uniform temperature than with other configurations.

FIGS. 5 through 10 show different embodiments of the nozzle 10.

FIG. 5 shows an embodiment according to the prior art in which the nozzle 10 has a body 50 having a cavity (in an embodiment the body 50 has a tubular shape) for example made out of steel or other metal with a support arm 51 connected in it. One end of the nozzle 10 is connected to the hose 9 and the other end has an occlusion 53 for the cavity connected to the support arm 51. The occlusion 53 defines together with the body 50 a slit 54. The slit 54 can have (but this is not mandatory) a convergent passage area from the inside of the body 50 to the outside thereof. During operation the reagent passes through the hose 9 and enters the cavity of the body 50; then the reagent is injected into the inner space 3 of the boiler via the slit 54.

FIGS. 6 through 8 show an embodiment of the nozzle 10 according to embodiments of the invention. In this embodiment the nozzle 10 has a body 50 with a cavity and a support arm 51 that supports one or more (in the example shown only one) intermediate discs 56 and the occlusion 53.

The discs 56 are provided with openings 57 for the passage of the reagent. The disc 56 defines with the body 50 a first slit 54*a* and with the occlusion 53 a second slit 54*b*; the slits 54*a* and 54*b* can have the same size SZ but in an embodiment they have different size SZ.

Injection through different slits allows a better spreading of the droplets through the flue gas. In addition, in case of injection through slits of different size, droplets of different diameter are formed after injection; droplets of different diameter evaporate in different parts of the boiler (smaller droplets evaporate faster), such that a better distribution of the reagent within the inner space 3 is achieved. Naturally also more than one disc and thus more than two slits are possible. For example FIG. 10A shows an embodiment of nozzle with more than one intermediate disc 56. In this case the first, second and third slits may have different size. In addition, even if the attached figures show the support arm 51 for withholding the intermediate disc(s) 56 and occlusion 53 also other configurations are possible. For example the intermediate disc(s) 56 can be supported directly from the body 50 and/or other intermediate disc(s) 56; in this case the slits can extend over only a part of the circumference of the nozzle 10 instead of the whole circumference thereof. Likewise, the occlusion 53 can be connected directly to the intermediate disc 56 instead of the support arm 51; in this case the second slit 54*b* can extend over only a part of the circumference of the nozzle 10.

FIGS. 9 and 10 show a further example of the nozzle 10 according to embodiments of the invention; in this embodiment the disc 56 has a border 59 delimiting the slit 54*a* that is not straight (like in the previous examples) but is corrugated in order to define a variable size slit between a minimum size (SZ1) and a maximum size (SZ2). Likewise, FIG. 10B shows an example of a nozzle with one slit 54 and with the occlusion 53 having the corrugated border.

Naturally also embodiments with solutions combining those described above are possible, such that for example the corrugated border can be provided at both the disc 56 and occlusion 53 or instead of or in addition to the border 59, also the inner border 60 (FIG. 10C) can have a corrugated shape.

In addition or as an alternative to the nozzle features (e.g. numbers of slits and/or their configuration) the reagent distribution and evaporation can also be improved by the pulsed injection, controlled via the control system 44 and valves 45.

Figure 12:
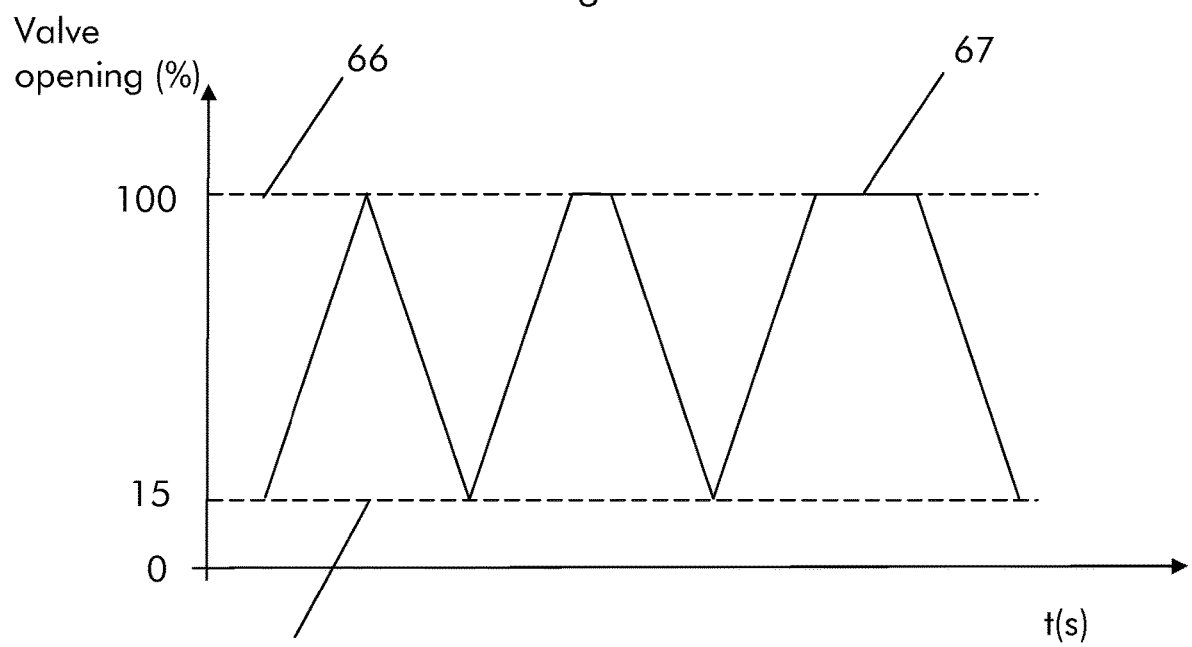
FIG. 12 shows the valve opening-time relationship for a pulsing injection of reagent.
Figure 15:
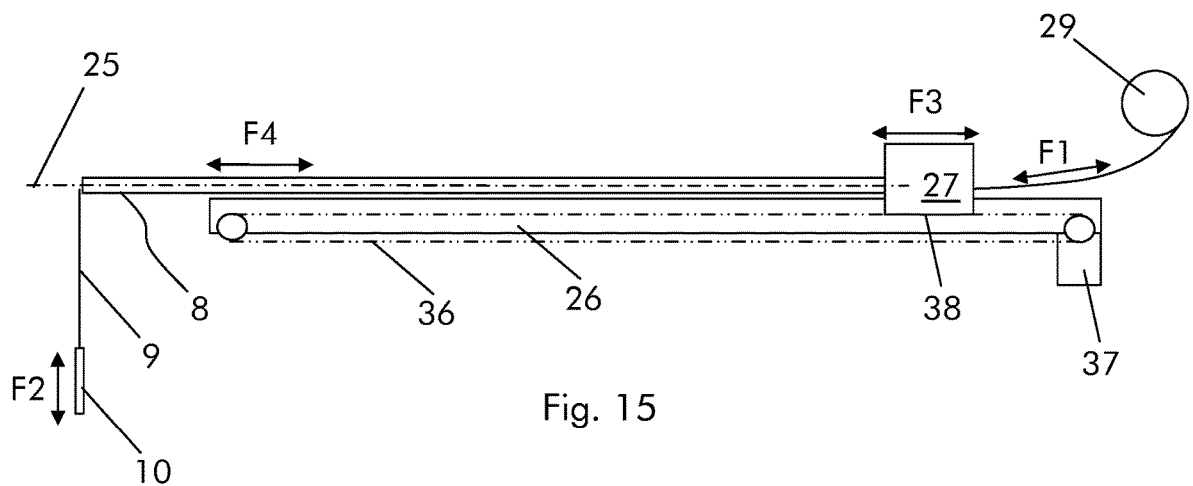
FIG. 15 shows a lance connected on a support beam.
Figure 16:
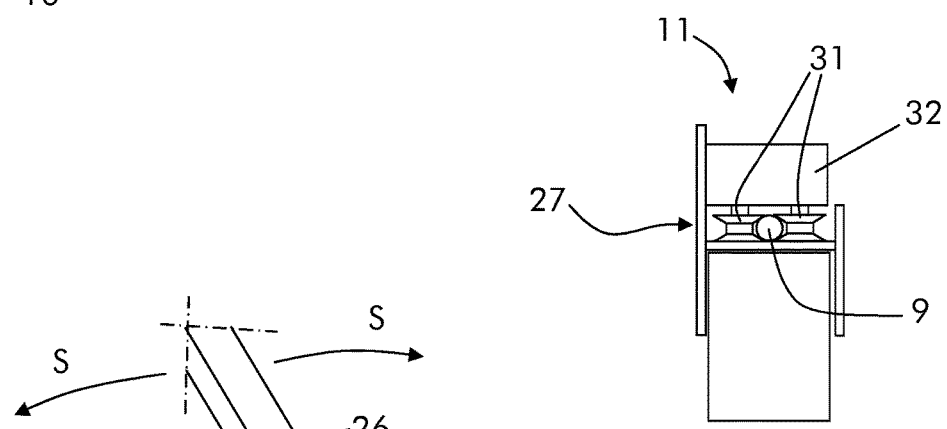
FIG. 16 shows a chariot connected to a support beam.
Figure 17:
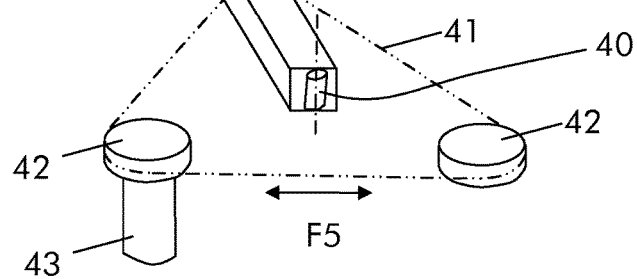
FIG. 17 shows an embodiment of a support beam with side position regulation.

FIG. 12 shows a relationship between the valve opening and time; it is clear that the minimum valve opening 65, the maximum valve opening 66, the duration of maximum opening 67 and the ramp frequency can be set according to the needs.

During operation, because of the varying volume flow, the exit velocity from the slits increases and/or decreases, this causes a change in the diameter of the reagent droplets. Droplets of different diameter evaporate differently such that with pulsing injection it is possible to achieve a larger evaporation zone than without it.

As a matter of example, FIGS. 13 and 14 show a view from the top of the area where the reagent droplets evaporate within the inner space 3; FIG. 13 refers to a nozzle embodiment with different slits 54*a*, 54*b* (for example the nozzle can have a configuration as shown in FIGS. 6-8) and FIG. 14 refers to a nozzle embodiment with pulsed reagent injection (for example the nozzle can have a configuration as shown in FIG. 5).

From FIG. 13 it is apparent that the droplets having a smaller diameter (e.g. injected through the slit 54*b*) evaporate faster than the droplets having a larger diameter (e.g. injected through the slit 54*a*). In this respect the annular area 68 indicates the zone where the droplets of smaller diameter evaporate and the area 69 indicate the zone where the droplet of larger diameter evaporate. From FIG. 13 it is apparent that the two (and possibly more than two) slits allow evaporation over a much larger area than in case only one slit is used.

FIG. 14 shows the zone 70 where evaporation of the reagent droplets occurs; also in this case it is apparent that the evaporation with pulsed injection is much larger than without pulsed injection; as an example line 71 indicates the possible evaporation starting point in case no pulsation is used.

After injection and evaporation, the reagent mixes with the flue gas and carries out the known selective non catalytic reaction to at least partly remove $NO_x$ from the flue gas.

Naturally the features described may be independently provided from one another.

In practice the materials used and the dimensions can be chosen at will according to requirements and to the state of the art.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A nozzle for injecting a reagent into a combustor, the nozzle comprising:
    a body with a cavity, the body extending along a longitudinal axis from a hose to an outlet end, the longitudinal axis of the body defining an axial direction;
    an occlusion for the cavity positioned at the outlet end of the body;
    at least one intermediate disc between the body and the occlusion, the at least one intermediate disc comprising at least one axial opening for the passage of the reagent;
    a first slit defined by and between the body and the at least one intermediate disc; and
    a second slit parallel to the first slit, the second slit defined by and between the occlusion and the at least one intermediate disc;
    wherein at least one of the occlusion and the at least one intermediate disc comprises at least one corrugated border, the at least one corrugated border defining a variable size of at least one of the first slit and the second slit between a non-zero minimum size and a maximum size.

2. The nozzle of claim 1, wherein the first slit defines a first height along the axial direction, the second slit defines a second height along the axial direction, and the first height is greater than the second height.

3. The nozzle of claim 1, wherein the at least one intermediate disc is a plurality of intermediate discs, wherein the first slit is defined by and between the body and a first intermediate disc of the plurality of intermediate discs, the second slit is defined by and between the occlusion and a second intermediate disc of the plurality of intermediate discs, and wherein at least a third slit parallel to the first slit and the second slit is defined between adjacent intermediate discs.

4. The nozzle of claim 1, wherein the first slit defines a first height along the axial direction, the second slit defines a second height along the axial direction, further comprising a third slit parallel to the first slit and the second slit, the third slit defining a third height along the axial direction, wherein each of the first height, the second height, and the third height differs from every other of the first height, the second height, and the third height.

5. The nozzle of claim 1, further comprising a support arm connected to the body and supporting the at least one intermediate disc.

6. The nozzle of claim 1, further comprising a support arm connected to the body and supporting the occlusion.

7. The nozzle of claim 1, wherein the nozzle is located in a device for selective non catalytic reduction which is associated with an arrangement of the combustor.

8. The nozzle of claim 7, wherein the device for selective non catalytic reduction comprises a lance carrying the hose comprising the nozzle and a hose drive mechanism for driving the hose within the lance.

9. The nozzle of claim 8, wherein the nozzle is arranged for injecting the flow with an angle A between the hose and the injected flow in the range $0°<A<180°$.

10. The nozzle of claim 9, wherein the angle A is in the range $90°<A<180°$.

11. The nozzle of claim 9, wherein the angle A is in the range $135°<A<155°$.

12. The nozzle of claim 7, wherein the combustor is a boiler having side tubed walls enclosing an inner space.

13. The nozzle of claim 8, wherein the lance protrudes into the inner space from a side tubed wall of the boiler.

14. The nozzle of claim 7, further comprising a control system for controlling the flow from the nozzle, the control system being arranged for generating a pulsed flow from the nozzle.

15. A nozzle for injecting a reagent into a combustor, the nozzle comprising:
    a body with a cavity, the body extending along a longitudinal axis from a hose to an outlet end, the longitudinal axis of the body defining an axial direction, and the outlet end of the body comprising a border extending along a direction oblique to the axial direction;
    an occlusion positioned at and partially obstructing the outlet end of the body, the occlusion comprising an inner surface facing the cavity and a border adjoining the inner surface, the inner surface perpendicular to the axial direction, the border of the occlusion extending along the direction oblique to the axial direction;
    an intermediate disc between the body and the occlusion, the intermediate disc comprising an outer surface, an outer border adjoining the outer surface, an inner surface spaced apart from the outer surface along the axial direction, and an inner border adjoining the inner surface of the intermediate disc, the outer surface of the intermediate disc facing the inner surface of the occlusion, the inner border and the outer border of the intermediate disc both extending along the direction oblique to the axial direction;
    a first slit defined by and between the border of the body and the inner border of the intermediate disc; and
    a second slit defined by and between the border of the occlusion and the outer border of the intermediate disc;
    wherein at least one of the border of the body, the inner border of the intermediate disc, the outer border of the intermediate disc, and the border of the occlusion is corrugated, the at least one corrugated border defining a variable height along the axial direction of at least one of the first slit and the second slit, the variable height of the at least one of the first slit and the second slit varying between a non-zero minimum height along the axial direction and a maximum height along the axial direction.

16. The nozzle of claim 15, wherein the border of the body and the inner border of the intermediate disc are spaced apart along the axial direction by a first distance, and wherein the outer border of the intermediate disc and the border of the occlusion are spaced apart along the axial direction by a second distance less than the first distance.

\* \* \* \* \*

UNITED STATES PATENT AND TRADEMARK OFFICE
CERTIFICATE OF CORRECTION

PATENT NO. : 10,563,862 B2  
APPLICATION NO. : 15/544714  
DATED : February 18, 2020  
INVENTOR(S) : Sascha Krüger, Jorg Krüger and Oliver Gohlke Page 1 of 1

It is certified that error appears in the above-identified patent and that said Letters Patent is hereby corrected as shown below:

On the Title Page

Item (73) Assignee should read as follows:  
GENERAL ELECTRIC TECHNOLOGY GMBH  
BADEN, SWITZERLAND Signed and Sealed this  
Twenty-first Day of June, 2022

Katherine Kelly Vidal  
*Director of the United States Patent and Trademark Office*